US 009508126B2

(12) United States Patent
Yang et al.

(10) Patent No.: US 9,508,126 B2
(45) Date of Patent: Nov. 29, 2016

(54) IMAGE HAZE REMOVAL USING FAST CONSTRAINED TRANSMISSION ESTIMATION

(71) Applicant: Adobe Systems Incorporated, San Jose, CA (US)

(72) Inventors: Jianchao Yang, San Jose, CA (US); Jue Wang, Kenmore, WA (US)

(73) Assignee: Adobe Systems Incorporated, San Jose, CA (US)

( * ) Notice: Subject to any disclaimer, the term of this patent is extended or adjusted under 35 U.S.C. 154(b) by 25 days.

(21) Appl. No.: 14/624,116

(22) Filed: Feb. 17, 2015

(65) Prior Publication Data

US 2016/0239945 A1 Aug. 18, 2016

(51) Int. Cl.
*G06K 9/00* (2006.01)
*G06T 5/00* (2006.01)
*G06T 5/10* (2006.01)
*G06T 3/40* (2006.01)

(52) U.S. Cl.
CPC ............... *G06T 5/002* (2013.01); *G06T 3/40* (2013.01); *G06T 5/10* (2013.01); *G06T 2207/10024* (2013.01)

(58) Field of Classification Search
None
See application file for complete search history.

(56) References Cited

U.S. PATENT DOCUMENTS

| 8,290,294 | B2 * | 10/2012 | Kopf | G06K 9/00624 382/167 |
| 8,837,857 | B2 * | 9/2014 | Hartley | G06T 5/003 348/207.1 |
| 9,288,458 | B1 * | 3/2016 | Chen | H04N 9/646 |
| 2011/0188775 | A1 * | 8/2011 | Sun | G06K 9/40 382/274 |
| 2013/0294689 | A1 * | 11/2013 | Jia | H04N 19/169 382/166 |
| 2014/0072216 | A1 * | 3/2014 | Fang | G06T 5/009 382/167 |
| 2014/0140619 | A1 * | 5/2014 | Mukhopadhyay | G06T 5/40 382/167 |
| 2014/0205192 | A1 * | 7/2014 | Wang | G06T 5/00 382/167 |
| 2014/0254931 | A1 * | 9/2014 | Lai | G06T 5/003 382/167 |

(Continued)

OTHER PUBLICATIONS

"Single Image Haze Removal Using Dark Channel Prior," Kaiming He et al, 2009, 8 pages.*

(Continued)

*Primary Examiner* — Wenpeng Chen
(74) *Attorney, Agent, or Firm* — Finch & Maloney PLLC

(57) ABSTRACT

Techniques are disclosed for removing haze from an image or video by constraining the medium transmission used in a haze image formation model. In particular, a de-hazed scene, which is a function of a medium transmission, is constrained to be greater than or equal to a fractionally scaled variant of the input image. The degree to which the input image is scaled can be selected manually or by using machine learning techniques on a pixel-by-pixel basis to achieve visually pleasing results. Next, the constrained medium transmission is filtered to be locally smooth with sharp discontinuities along image edge boundaries to preserve scene depth. This filtering results in a prior probability distribution that can be used for haze removal in an image or video frame. The input image is converted to gamma decoded sRGB linear space prior to haze removal, and gamma encoded into sRGB space after haze removal.

20 Claims, 5 Drawing Sheets
(3 of 5 Drawing Sheet(s) Filed in Color)

(56) References Cited

U.S. PATENT DOCUMENTS

| | | | | |
|---|---|---|---|---|
| 2014/0327674 | A1* | 11/2014 | Sorkine-Hornung | G06T 7/0065 345/426 |
| 2014/0328535 | A1* | 11/2014 | Sorkine-Hornung | G06T 5/00 382/154 |
| 2015/0161769 | A1* | 6/2015 | Hong | G06K 9/4661 382/274 |
| 2015/0243003 | A1* | 8/2015 | Choi | G06T 5/003 382/274 |
| 2015/0279003 | A1* | 10/2015 | Higaki | G06K 9/4661 382/254 |
| 2015/0287170 | A1* | 10/2015 | Hong | G06T 5/002 382/274 |
| 2015/0304524 | A1* | 10/2015 | Toda | G06T 5/001 382/167 |
| 2016/0005152 | A1* | 1/2016 | Yang | G06K 9/40 382/275 |
| 2016/0063684 | A1* | 3/2016 | Park | G06T 5/003 348/241 |

OTHER PUBLICATIONS

"Real-time Dehazing for Image and Video," Xingyong Lv et al, 2010 18th Pacific Conference on Computer Graphics and Applications, 2010, pp. 62-69.*

Ancuti, et al., "A Fast Semi-Inverse Approach to Detect and Remove the Haze from a Single Image," Hasselt University, Expertise enter for Digital Medial. Downloaded from the Internet,—URL:https://doclib.uhasselt.be/dspace/bitstream/1942/11702/1/FINAL_ACCV_Dehazing.pdf. Jan. 2015. 14 pages.

Fattal, Raanan, "Single Image Dehazing," Hebrew University of Jerusalem, Israel. Downloaded from the Internet, URL: http://www.cs.huji.ac.il/~raananf/papers/defog.pdf. Jan. 2015. 9 pages.

He, et al., "Single Image Haze Removal Using dark Channel Prior," The Chinese University of Hong Kong and Microsoft Research Asia. Downloaded from the Internet, URL: http://research.microsoft.com/en-us/um/people/jiansun/papers/Dehaze_CVPR2009.pdf. Jan. 2015. 8 pages.

Tan, Robby T., "Visibility in Bad Weather from a Single Image," Imperial College London. Communications and Signal Processing Group. Downloaded from the Internet, URL: http://mplab.ucsd.edu/wp-content/uploads/CVPR2008/Conference/data/papers/303.pdf. Jan. 2015. 8 pages.

Tarel, et al., "Fast Visibility Restoration from a Single Color or Gray Level Image," LCPC-INRETS (LEPSIS). Downloaded from the Internet, URL: http://perso.lcpc.fr/hautiere.nicolas/pdf/2009/hautiere-iccv09.pdf. Jan. 2015. 8 pages.

* cited by examiner

IMAGE HAZE REMOVAL USING FAST CONSTRAINED TRANSMISSION ESTIMATION

FIELD OF THE DISCLOSURE

This disclosure relates to the field of image processing, and more particularly, to techniques for removing haze from an image or video.

BACKGROUND

Haze, fog, smoke, moisture and other particulates in the atmosphere can obscure details in an image of an outdoor scene due to light absorption and scattering. The irradiance received by the camera from the scene is attenuated along the line of sight. As a result, the degraded images lose contrast and color fidelity, such as seen in FIG. 1A. Haze removal is highly desired in both consumer/computational photography and computer vision applications. Removing haze from the image can significantly improve the visibility of the scene and correct the color shift, which makes the photo much more visually pleasing. Haze removal can also be used to recover scene depth, which can benefit many computer vision applications and advanced image editing tasks that interpret the content of the scene. However, some existing haze removal techniques produce images that suffer artifacts resulting from, among other things, noise boosting, excessive de-hazing, and incorrect color shifts. Thus, there is a need for improved haze removal techniques that produce acceptable results for a variety of image processing applications.

BRIEF DESCRIPTION OF THE DRAWINGS

The file of this patent contains at least one drawing/photograph executed in color. Copies of this patent with color drawing(s)/photograph(s) will be provided by the Office upon request and payment of the necessary fee.

The accompanying drawings are not intended to be drawn to scale. In the drawings, each identical or nearly identical component that is illustrated in various figures is represented by a like numeral.

DETAILED DESCRIPTION

Techniques are disclosed for removing haze from an image or video by constraining the medium transmission used in a haze image formation model. In particular, a de-hazed scene, which is a function of a medium transmission, is constrained to be greater than or equal to a fractionally scaled variant of the input image. The degree to which the input image is scaled can be selected manually or by using machine learning techniques on a pixel-by-pixel basis to achieve visually pleasing results. Next, the constrained medium transmission is filtered to be locally smooth with sharp discontinuities along image edge boundaries to preserve scene depth. This filtering results in a prior probability distribution that can be used for haze removal in an image or video frame. The input image is converted to gamma decoded sRGB linear space prior to haze removal, and gamma encoded into sRGB space after haze removal.

Figure 1A:
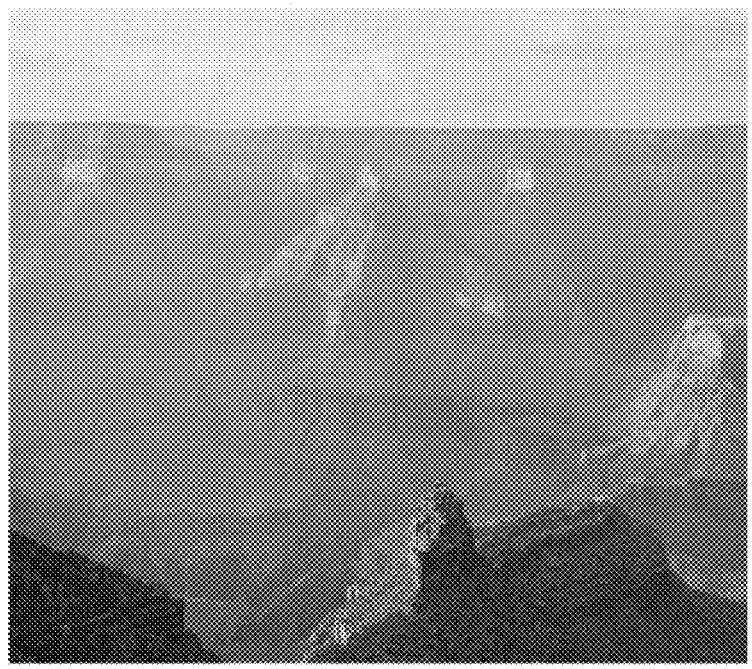
FIG. 1A is an example image having haze effects.
Figure 1B:
FIG. 1B shows the result of haze removal in the example image of FIG. 1A using an existing haze removal technique.

FIG. 1B shows the result of haze removal from the example image of FIG. 1A using an existing haze removal technique. As can be seen, after haze removal the image is much more visually appealing. The following known haze image formation model can be used with a haze removal technique, in accordance with an embodiment of the present invention:

$$I(x)=J(x)t(x)+A(1-t(x)) \qquad (1)$$

In equation (1), I is the observed hazy input image, J is a radiance vector representing the de-hazed scene to be recovered from the input image, t is the medium transmission, A is the global atmospheric light or airlight, which is ambient light scattered by particulates in the atmosphere, and x denotes pixel coordinates. The medium transmission $t=e^{-kd(x)}$ describes the portion of the light that is not scattered and reaches the camera, where $d(x)$ is the distance from the scene point to the camera, and k is the scattering coefficient of the atmosphere. Haze removal generally involves estimating J, t, and A from the single input image I. Such estimation has a large ambiguity since, even in cases where atmospheric light A is well-estimated, vectors A, I(x) and J(x) are coplanar and their ending points are collinear in RGB space geometrically. For example, while using a small t can produce acceptable haze removal in some instances, in other instances a small t can produce undesirable artifacts for some pixels or image regions. Likewise, while a large t produces fewer artifacts, haze removal is less effective when a t is large. As such, haze removal using existing techniques can be an ill-posed problem.

To this end, and in accordance with an embodiment of the present invention, an improved technique is disclosed for removing haze from an image or video by constraining the medium transmission used in a haze image formation model. In particular, referring to equation (1), the de-hazed scene J, which is a function of the medium transmission t, is constrained to be greater than or equal to a fractionally scaled variant of the input image I. The degree to which the input image I is scaled can be selected manually or by using machine learning techniques on a pixel-by-pixel basis to achieve visually pleasing results. Further, the constrained medium transmission t is filtered to be locally smooth with sharp discontinuities along image edge boundaries to preserve scene depth. This filtering results in a prior probability distribution ("prior") that can be used for haze removal in an image or video frame. Additionally, the input image I is converted to gamma decoded sRGB linear space prior to haze removal, if I does not already include such sRGB linear data, to reduce blue cast artifacts in the de-hazed image. After haze removal, the image J can be gamma encoded into sRGB space. Using these priors or constraints, the medium transmission t can be resolved with less ambiguity than can be achieved using existing techniques, which helps to preserve image content visibility after haze removal. This technique is especially useful for practical applications to avoid overly dark regions. Furthermore, the pixel-wise filtering can be performed very quickly. Numerous configurations and variations will be apparent in light of this disclosure.

Example Constrained Transmission Estimation Algorithm

Equation (1) above is an example haze image formation model that can be used in conjunction with an embodiment of the present invention. From equation (1), the real, de-hazed scene J can be recovered from the input image I, the atmospheric light A, and medium transmission t as follows:

$$J = \frac{I-A}{t} + A \qquad (2)$$

From the physical properties of equation (1), the following constraints for the medium transmission t can be derived, where I is normalized between 0 and 1:

$$0 \leq t \leq 1, \qquad (3)$$

$$0 \leq J^c \leq 1, \forall c \in \{r,g,b\} \qquad (4)$$

where $J^c$ denotes the color channel c, selected from the set including, for example, red, green and blue. In equation (3), 0 and 1 are the physical bounds for t. In equation (4), $J^c$ is constrained in the range of [0, 1] to avoid undershoot and overshoot of the result image, which causes texture loss. The constraints of equations (3) and (4), when applied to equation (2), translate into:

$$\max\left\{1 - \min_c \frac{I^c}{A^c}, 1 - \min_c \frac{\tilde{I}^c}{\tilde{A}^c}\right\} \leq t \leq 1, \qquad (5)$$

where $\tilde{I}^c = 1 - I^c$ is the inverse image of $I^c$, and $\tilde{A}^c = 1 - A^c$.

It will be noted that in equation (5), there is a large ambiguity in identifying the lower bound for the medium transmission t. Haze removal is a technique for boosting the local contrast and color saturation in an adaptive and systematic manner. Smaller t can lead to more contrast and saturation boost, which is desirable in many cases for haze removal. However, directly using the lower bound for t may result in excessively de-hazing some pixels or regions, causing visually unpleasing artifacts. Certain regularization or prior on the medium transmission t can be used to resolve the ambiguity. For example, a constraint on the recovered image J can follow the natural image statistics, and estimating the medium transmission t can accordingly be translated into an energy minimization problem. Such an energy function penalizes solutions far away from the natural image statistics (e.g., total variation). However, finding a good form of the energy function is a challenging problem in the area of image restoration, and optimization is slow in practical applications.

To that end, in accordance with an embodiment, an estimated medium transmission t is constrained to preserve image content visibility and have local smoothness with sharp discontinuities along image boundaries. The first constraint regarding content visibility relates the de-hazed scene J to a fractionally scaled variant of the input image I:

$$J = \frac{I-A}{t} + A \geq sI \qquad (6)$$

$$t \geq \frac{1 - A/I}{1 - sA/I} \qquad (7)$$

where s is a small fraction in the range [0,1). Generally, the scaling factor s can be a function of the input image I. For example, when I(x) is very small, s(x) may be large so that J(x) is not overly dark. In some cases, the scaling factor s can be manually defined or learned based on training data. For example, s can be defined as a function of I as follows:

$$s(x) = \begin{cases} \frac{0.02}{I(x)}, & I(x) > 0.1 \\ 0.2, & I(x) \leq 0.1 \end{cases} \qquad (8)$$

Figure 2A:
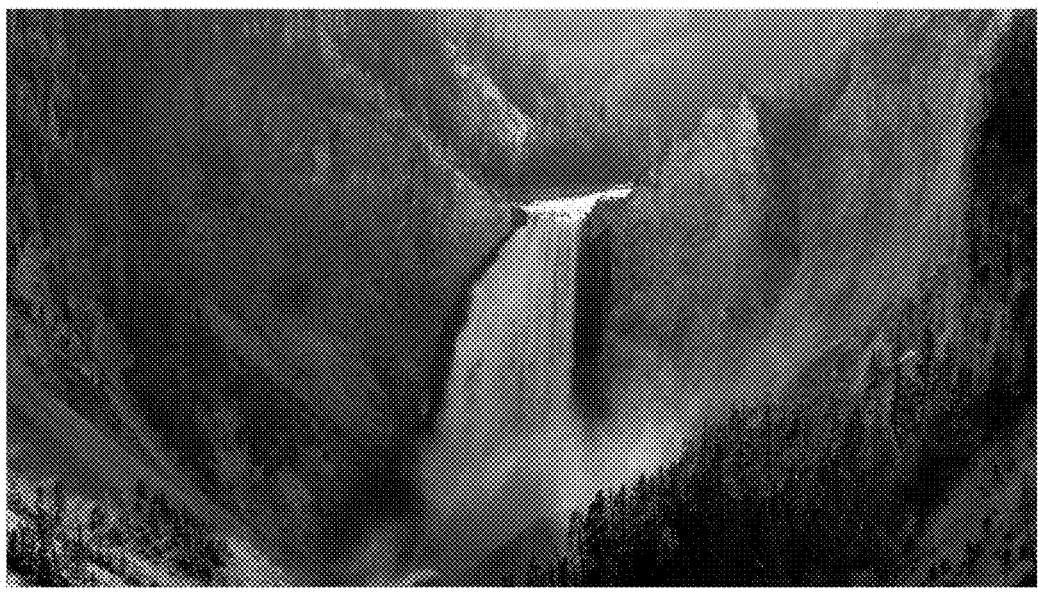
FIG. 2A shows an example image subsequent to de-hazing using only geometric constraints.
Figure 2B:
FIG. 2B shows an example image subsequent to de-hazing using constraints according to an embodiment of the present invention.

The second constraint regarding local smoothness can be obtained by filtering the medium transmission t:

$$t_2(x) = F(\{t_1(y)\}_{y \in N(x)}) \qquad (9)$$

where N(x) defines a neighborhood set around x. For example, N(x) may include a squared p×p patch centered at x of a superpixel (e.g., group of pixels) that includes x, and F is a smoothing function, such as mean filtering, median filtering or minimum filtering. In one embodiment, a superpixel with minimum filtering can be used to produce acceptable results. After obtaining medium transmission $t_2$, a joint filtering method can be used to align the medium transmission with the image content (e.g., the edges). For this step, a joint bilateral filter or guided filter can be used. FIGS. 2A and 2B show one example result comparison between two images using only geometric constraints (FIG. 2A) and constraints according to an embodiment (FIG. 2B). As can be seen, the de-hazed image of FIG. 2B is of much better visual quality than the de-hazed image of FIG. 2A as a result of using a constrained medium transmission with local smoothing to recover the de-hazed image.

Example Color Space Transform

Figure 3A:
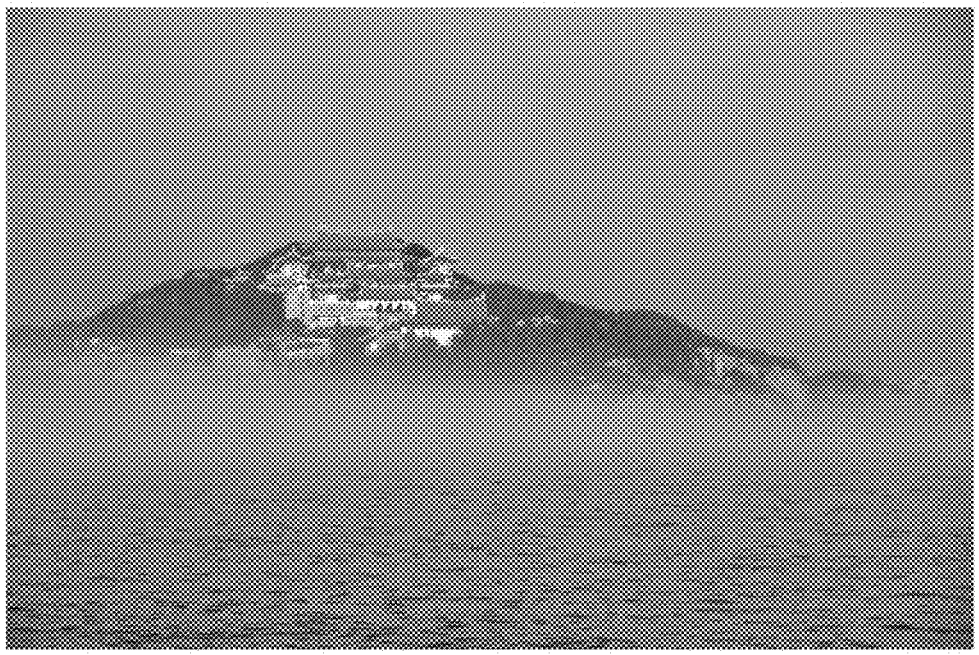
FIG. 3A shows an example of an image in which haze removal was performed in sRGB space.

The haze image formation model used in equation (1) is based on the acquisition signals. However, some existing de-hazing algorithms are processing sRGB images directly, which are nonlinear data after gamma encoding. De-hazing in sRGB space RGB image can create blue cast artifacts due to the incorrect atmospheric light estimation, such as shown in FIG. 3A. Therefore, according to an embodiment, prior to applying the haze removal algorithm, the input image I is converted from sRGB space to sRGB linear space. One example gamma decoding process is as follows:

double GammaDecode (double I)
{
   if (I<=0.0031308*12.92)
   return I*(1.0/12.92);
   else
   return pow ((I+0.055)*(1.0/1.055), 2.4);
}

Figure 3B:
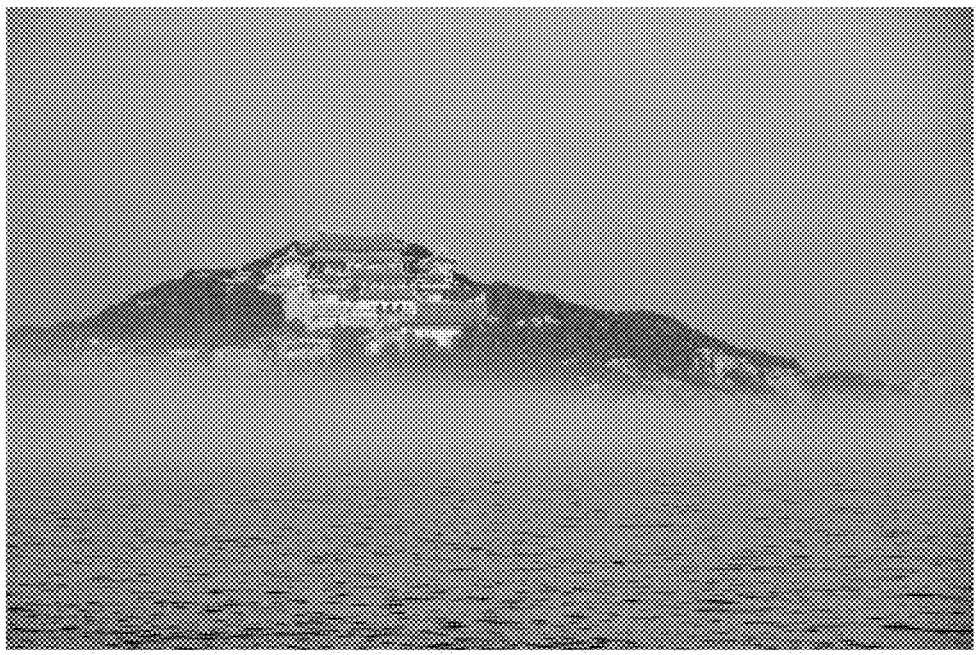
FIG. 3B shows an example of an image in which haze removal was performed in sRGB linear space, in accordance with an embodiment of the present invention.

After performing haze removal in the sRGB linear space, the image can then be gamma encoded into sRGB space. FIG. 3B shows an example of an image in which haze removal was performed in sRGB linear space.

Example Methodology

Figure 4:
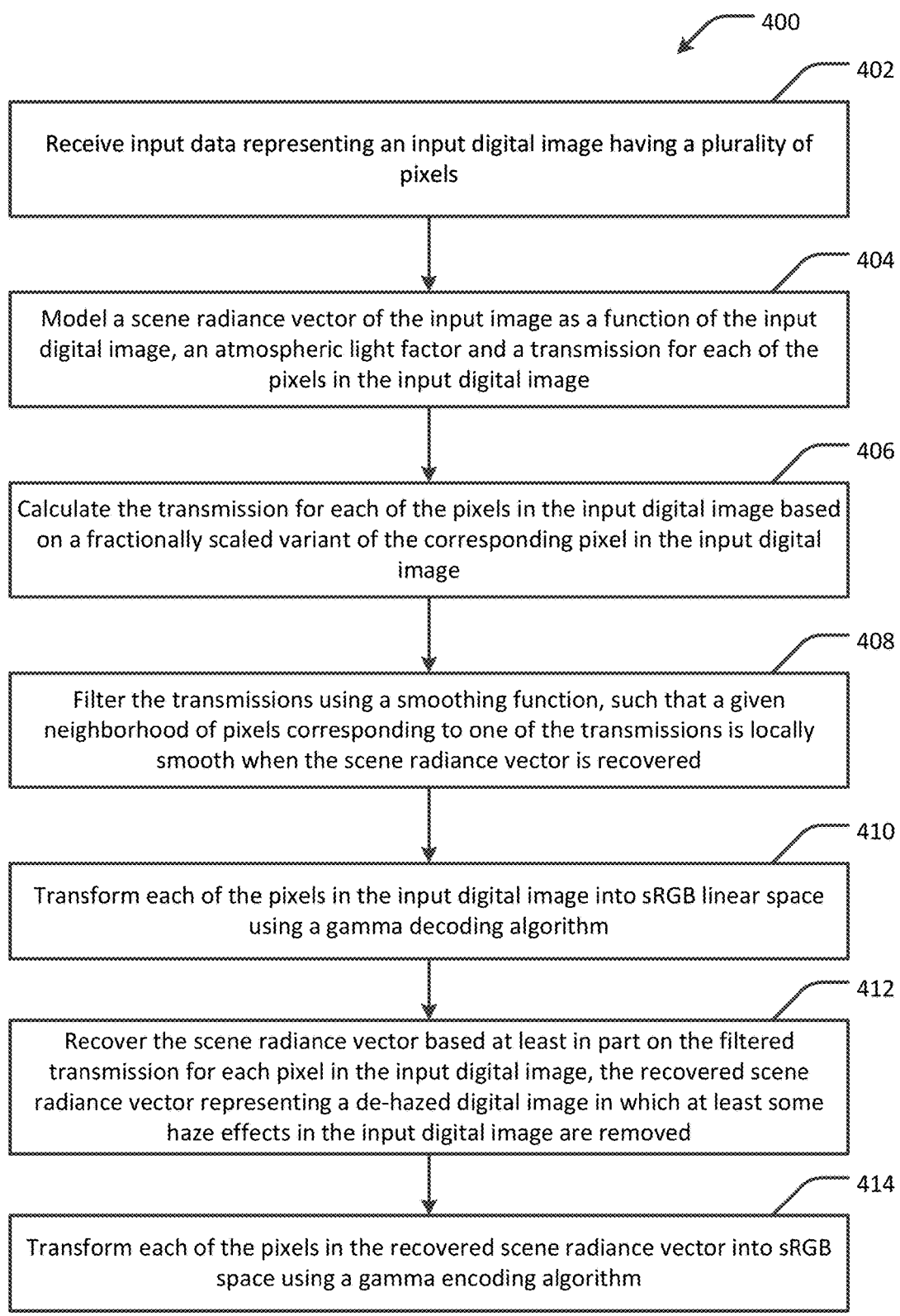
FIG. 4 is a flow diagram of an example methodology for removing haze from an image or video, in accordance with an embodiment of the present invention.

FIG. 4 is a flow diagram of an example methodology 400 for removing haze from an image or video by constraining the medium transmission used in a haze image formation model. The method 400 may be performed, for example, in whole or in part by the computing device 1000 of FIG. 5. The method 400 begins by receiving 402 input data representing an input digital image having a plurality of pixels. The method 400 continues by modeling 404 a scene radiance vector of the input image as a function of the input digital image, an atmospheric light factor, and a medium transmission for each of the pixels in the input digital image. The method 400 continues by calculating 406 the medium transmission for each of the pixels in the input digital image based on a fractionally scaled variant of the corresponding pixel in the input digital image. The method 400 continues by filtering 408 the medium transmissions using a smoothing function, such that a given neighborhood of pixels corresponding to one of the medium transmissions is locally smooth when the scene radiance vector is recovered. In some cases, the smoothing function includes a mean filter, a median filter, or a minimum filter. The method 400 continues by transforming 410 each of the pixels in the input digital image into sRGB linear space using a gamma decoding algorithm prior to recovering 412 the scene radiance vector. The method 400 continues by recovering 412 the scene radiance vector based at least in part on the filtered medium transmission for each pixel in the input digital image. The recovered scene radiance vector represents a de-hazed digital image in which at least some haze effects in the input digital image are removed. The method 400 continues by transforming 414 each of the pixels in the recovered scene radiance vector into sRGB space using a gamma encoding algorithm.

Example Computing Device

Figure 5:
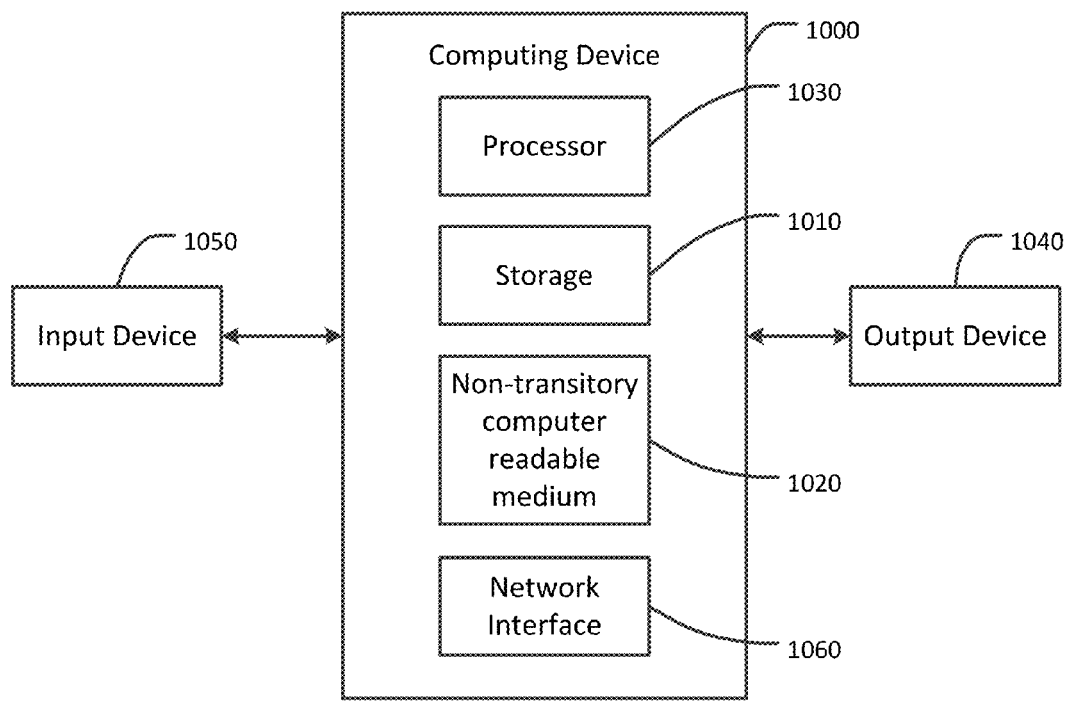
FIG. 5 is a block diagram representing an example computing device that may be used in accordance with an embodiment of the present invention.

FIG. 5 is a block diagram representing an example computing device 1000 that may be used to perform any of the techniques as variously described in this disclosure. For example, the user computing system, the desktop publishing application, the document conversion module, the document viewer, or any combination of these may be implemented in the computing device 1000. The computing device 1000 may be any computer system, such as a workstation, desktop computer, server, laptop, handheld computer, tablet computer (e.g., the iPad™ tablet computer), mobile computing or communication device (e.g., the iPhone™ mobile communication device, the Android™ mobile communication device, and the like), or other form of computing or telecommunications device that is capable of communication and that has sufficient processor power and memory capacity to perform the operations described in this disclosure. A distributed computational system may be provided comprising a plurality of such computing devices.

The computing device 1000 includes one or more storage devices 1010 and/or non-transitory computer-readable media 1020 having encoded thereon one or more computer-executable instructions or software for implementing techniques as variously described in this disclosure. The storage devices 1010 may include a computer system memory or random access memory, such as a durable disk storage (which may include any suitable optical or magnetic durable storage device, e.g., RAM, ROM, Flash, USB drive, or other semiconductor-based storage medium), a hard-drive, CD-ROM, or other computer readable media, for storing data and computer-readable instructions and/or software that implement various embodiments as taught in this disclosure. The storage device 1010 may include other types of memory as well, or combinations thereof. The storage device 1010 may be provided on the computing device 1000 or provided separately or remotely from the computing device 1000. The non-transitory computer-readable media 1020 may include, but are not limited to, one or more types of hardware memory, non-transitory tangible media (for example, one or more magnetic storage disks, one or more optical disks, one or more USB flash drives), and the like. The non-transitory computer-readable media 1020 included in the computing device 1000 may store computer-readable and computer-executable instructions or software for implementing various embodiments. The computer-readable media 1020 may be provided on the computing device 1000 or provided separately or remotely from the computing device 1000.

The computing device 1000 also includes at least one processor 1030 for executing computer-readable and computer-executable instructions or software stored in the storage device 1010 and/or non-transitory computer-readable media 1020 and other programs for controlling system hardware. Virtualization may be employed in the computing device 1000 so that infrastructure and resources in the computing device 1000 may be shared dynamically. For example, a virtual machine may be provided to handle a process running on multiple processors so that the process appears to be using only one computing resource rather than multiple computing resources. Multiple virtual machines may also be used with one processor.

A user may interact with the computing device 1000 through an output device 1040, such as a screen or monitor, which may display one or more user interfaces provided in accordance with some embodiments. The output device 1040 may also display other aspects, elements and/or information or data associated with some embodiments. The computing device 1000 may include other I/O devices 1050 for receiving input from a user, for example, a keyboard, a joystick, a game controller, a pointing device (e.g., a mouse, a user's finger interfacing directly with a display device, etc.), or any suitable user interface. The computing device 1000 may include other suitable conventional I/O peripherals, such as a camera 1052. The computing device 1000 can include and/or be operatively coupled to various suitable devices for performing one or more of the functions as variously described in this disclosure.

The computing device 1000 may run any operating system, such as any of the versions of Microsoft® Windows® operating systems, the different releases of the Unix and Linux operating systems, any version of the MacOS® for Macintosh computers, any embedded operating system, any real-time operating system, any open source operating system, any proprietary operating system, any operating systems for mobile computing devices, or any other operating system capable of running on the computing device 1000 and performing the operations described in this disclosure. In an embodiment, the operating system may be run on one or more cloud machine instances.

In other embodiments, the functional components/modules may be implemented with hardware, such as gate level logic (e.g., FPGA) or a purpose-built semiconductor (e.g., ASIC). Still other embodiments may be implemented with a microcontroller having a number of input/output ports for receiving and outputting data, and a number of embedded routines for carrying out the functionality described in this disclosure. In a more general sense, any suitable combination of hardware, software, and firmware can be used, as will be apparent.

As will be appreciated in light of this disclosure, the various modules and components of the system can be implemented in software, such as a set of instructions (e.g., HTML, XML, C, C++, object-oriented C, JavaScript, Java, BASIC, etc.) encoded on any computer readable medium or computer program product (e.g., hard drive, server, disc, or other suitable non-transient memory or set of memories), that when executed by one or more processors, cause the various methodologies provided in this disclosure to be carried out. It will be appreciated that, in some embodiments, various functions performed by the user computing system, as described in this disclosure, can be performed by similar processors and/or databases in different configurations and arrangements, and that the depicted embodiments are not intended to be limiting. Various components of this example embodiment, including the computing device 1000, can be integrated into, for example, one or more desktop or laptop computers, workstations, tablets, smart phones, game consoles, set-top boxes, or other such computing devices. Other componentry and modules typical of a computing system, such as processors (e.g., central processing unit and co-processor, graphics processor, etc.), input devices (e.g., keyboard, mouse, touch pad, touch screen, etc.), and operating system, are not shown but will be readily apparent.

Numerous embodiments will be apparent in light of the present disclosure, and features described in this disclosure can be combined in any number of configurations. One example embodiment provides a system including a storage having at least one memory, and one or more processors each operatively coupled to the storage. The one or more processors are configured to carry out a process including receiving, by a processor, input data representing an input digital image having a plurality of pixels; modeling a scene radiance vector of the input image as a function of the input digital image, an atmospheric light factor, and a medium transmission for each of the pixels in the input digital image; calculating the medium transmission for each of the pixels in the input digital image based on a fractionally scaled variant of the corresponding pixel in the input digital image; filtering the medium transmissions using a smoothing function, such that a given neighborhood of pixels corresponding to one of the medium transmissions is locally smooth; and recovering the scene radiance vector based at least in part on the filtered medium transmission for each pixel in the input digital image, the recovered scene radiance vector representing a de-hazed digital image in which at least some haze effects in the input digital image are removed. In some cases, the process includes transforming each of the pixels in the input digital image into sRGB linear space using a gamma decoding algorithm prior to recovering the scene radiance vector. In some cases, the process includes transforming each of the pixels in the recovered scene radiance vector into sRGB space using a gamma encoding algorithm. Another embodiment provides a non-transient computer-readable medium or computer program product having instructions encoded thereon that when executed by one or more processors cause the processor to perform one or more of the functions defined in the present disclosure, such as the methodologies variously described in this paragraph. In some cases, some or all of the functions variously described in this paragraph can be performed in any order and at any time by one or more different processors.

The foregoing description and drawings of various embodiments are presented by way of example only. These examples are not intended to be exhaustive or to limit the invention to the precise forms disclosed. Alterations, modifications, and variations will be apparent in light of this disclosure and are intended to be within the scope of the invention as set forth in the claims.

What is claimed is:

1. A computer-implemented digital image processing method comprising:
    receiving, by a processor, input data representing an input digital image having a plurality of pixels;
    modeling a scene radiance vector of the input digital image as a function of the input digital image, an atmospheric light factor, and a medium transmission for each of the pixels in the input digital image;
    calculating, by the processor, the medium transmission for each of the pixels in the input digital image based on a fractionally scaled variant of the corresponding pixel in the input digital image, the fractionally scaled variant being calculated using a scaling factor that is a function of the input digital image;
    filtering, by the processor, the medium transmission for each of the pixels in the input digital image using a smoothing function, such that a given neighborhood of pixels corresponding to the medium transmission for each of the pixels in the input digital image is locally smooth; and
    recovering, by the processor, the scene radiance vector based at least in part on the filtered medium transmission for each pixel in the input digital image, the recovered scene radiance vector representing a de-hazed digital image in which at least some haze effects in the input digital image are removed.

2. The method of claim 1, further comprising transforming, by the processor, each of the pixels in the input digital image into sRGB linear space using a gamma decoding algorithm prior to recovering the scene radiance vector.

3. The method of claim 1, further comprising transforming, by the processor, each of the pixels in the recovered scene radiance vector into sRGB space using a gamma encoding algorithm.

4. The method of claim 1, wherein the calculated medium transmission is defined as:

$$t \geq \frac{1 - A/I}{1 - sA/I}$$

wherein t represents the calculated medium transmission, I represents the input digital image, A represents the atmospheric light factor, and s represents a scaling factor.

5. The method of claim 4, wherein the scaling factor is defined as:

$$s(x) = \begin{cases} \frac{0.02}{I(x)}, & I(x) > 0.1 \\ 0.2, & I(x) \leq 0.1 \end{cases}.$$

6. The method of claim 4, wherein t is less than or equal to 1.

7. The method of claim 1, wherein the smoothing function includes one of a mean filter, a median filter and a minimum filter.

8. A system comprising:
    a storage; and
    a processor operatively coupled to the storage, the processor configured to execute instructions stored in the storage that when executed cause the processor to carry out a process comprising:
        receiving input data representing an input digital image having a plurality of pixels;
        modeling a scene radiance vector of the input digital image as a function of the input digital image, an atmospheric light factor, and a medium transmission for each of the pixels in the input digital image;
        calculating the medium transmission for each of the pixels in the input digital image based on a fractionally scaled variant of the corresponding pixel in the input digital image, the fractionally scaled variant being calculated using a scaling factor that is a function of the input digital image;

filtering the medium transmission for each of the pixels in the input digital image using a smoothing function, such that a given neighborhood of pixels corresponding to the medium transmission for each of the pixels in the input digital image is locally smooth; and recovering the scene radiance vector based at least in part on the filtered medium transmission for each pixel in the input digital image, the recovered scene radiance vector representing a de-hazed digital image in which at least some haze effects in the input digital image are removed.

9. The system of claim 8, wherein the process includes transforming each of the pixels in the input digital image into sRGB linear space using a gamma decoding algorithm prior to recovering the scene radiance vector.

10. The system of claim 8, wherein the process includes transforming each of the pixels in the recovered scene radiance vector into sRGB space using a gamma encoding algorithm.

11. The system of claim 8, wherein the calculated medium transmission is defined as:

$$t \geq \frac{1 - A/I}{1 - sA/I}$$

wherein t represents the calculated medium transmission, I represents the input digital image, A represents the atmospheric light factor, and s represents a scaling factor.

12. The system of claim 11, wherein the scaling factor is defined as:

$$s(x) = \begin{cases} \frac{0.02}{I(x)}, & I(x) > 0.1 \\ 0.2, & I(x) \leq 0.1 \end{cases}.$$

13. The system of claim 8, wherein the smoothing function includes one of a mean filter, a median filter and a minimum filter.

14. A computer program product having instructions encoded in a non-transitory computer readable medium that when executed by one or more processors cause a process to be carried out, the process comprising:

receiving input data representing an input digital image having a plurality of pixels;

modeling a scene radiance vector of the input digital image as a function of the input digital image, an atmospheric light factor, and a medium transmission for each of the pixels in the input digital image;

calculating the medium transmission for each of the pixels in the input digital image based on a fractionally scaled variant of the corresponding pixel in the input digital image, the fractionally scaled variant being calculated using a scaling factor that is a function of the input digital image;

filtering the medium transmission for each of the pixels in the input digital image using a smoothing function, such that a given neighborhood of pixels corresponding to the medium transmission for each of the pixels in the input digital image is locally smooth; and recovering the scene radiance vector based at least in part on the filtered medium transmission for each pixel in the input digital image, the recovered scene radiance vector representing a de-hazed digital image in which at least some haze effects in the input digital image are removed.

15. The computer program product of claim 14, wherein the process includes transforming each of the pixels in the input digital image into sRGB linear space using a gamma decoding algorithm prior to recovering the scene radiance vector.

16. The computer program product of claim 14, wherein the process includes transforming each of the pixels in the recovered scene radiance vector into sRGB space using a gamma encoding algorithm.

17. The computer program product of claim 14, wherein the calculated medium transmission is defined as:

$$t \geq \frac{1 - A/I}{1 - sA/I}$$

wherein t represents the calculated medium transmission, I represents the input digital image, A represents the atmospheric light factor, and s represents a scaling factor.

18. The computer program product of claim 17, wherein the scaling factor is defined as:

$$s(x) = \begin{cases} \frac{0.02}{I(x)}, & I(x) > 0.1 \\ 0.2, & I(x) \leq 0.1 \end{cases}.$$

19. The computer program product of claim 17, wherein t is less than or equal to 1.

20. The computer program product of claim 14, wherein the smoothing function includes one of a mean filter, a median filter and a minimum filter.

* * * * *